United States Patent
Aparicio, IV et al.

(10) Patent No.: US 7,574,416 B2
(45) Date of Patent: Aug. 11, 2009

(54) DISTANCE-BASED SPATIAL REPRESENTATION AND PREDICTION SYSTEMS, METHODS AND COMPUTER PROGRAM PRODUCTS FOR ASSOCIATIVE MEMORIES

(75) Inventors: Manuel Aparicio, IV, Chapel Hill, NC (US); David R. Cabana, Cary, NC (US)

(73) Assignee: Saffron Technology, Inc., Morrisville, NC (US)

( * ) Notice: Subject to any disclaimer, the term of this patent is extended or adjusted under 35 U.S.C. 154(b) by 720 days.

(21) Appl. No.: 11/036,641

(22) Filed: Jan. 14, 2005

(65) Prior Publication Data

US 2005/0163347 A1    Jul. 28, 2005

Related U.S. Application Data

(60) Provisional application No. 60/537,460, filed on Jan. 16, 2004.

(51) Int. Cl.
G06N 7/00 (2006.01)
G06N 7/08 (2006.01)
G06N 5/02 (2006.01)
G06E 1/00 (2006.01)
G06E 3/00 (2006.01)
G06G 7/00 (2006.01)
G06K 9/00 (2006.01)

(52) U.S. Cl. .............. 706/58; 706/10; 706/18; 706/48; 382/103

(58) Field of Classification Search ............ 382/103; 706/10, 48, 58, 54, 18; 348/142, 143, 169
See application file for complete search history.

(56) References Cited

U.S. PATENT DOCUMENTS

| | | | |
|---|---|---|---|
| 4,660,166 A | | 4/1987 | Hopfield |
| 5,054,094 A | * | 10/1991 | Barski .................. 706/20 |
| 5,299,269 A | * | 3/1994 | Gaborski et al. ........ 382/156 |
| 5,870,136 A | | 2/1999 | Fuchs et al. |
| 5,895,436 A | * | 4/1999 | Savoie et al. ............ 701/214 |

(Continued)

OTHER PUBLICATIONS

Hortos,W.S. "Analysis of the Deployment of Transportable Base Stations in Personal Communication Services Networks With Expanded User Location Features" isbn#0-7803-3268-7. 1996.*

(Continued)

*Primary Examiner*—David R Vincent
*Assistant Examiner*—Benjamin Buss
(74) *Attorney, Agent, or Firm*—Myers Bigel Sibley & Sajovec

(57) ABSTRACT

A location of a missing object is predicted based on past sightings of objects including the missing object, and a new sighting of the objects except for the missing object. For a respective given object in the objects, the past sightings are memorized based on respective distances of respective remaining objects from the respective given object. Distance-based memorization may take place using an agent or associative memory for a respective given object. Then, for a respective given object, except for the missing object, a distance of the missing object from the respective given object is predicted, based on the past sightings that have been memorized and the new sighting, to obtain candidate locations for the missing object. The candidate locations are then disambiguated, to predict the location of the missing object.

20 Claims, 17 Drawing Sheets

U.S. PATENT DOCUMENTS

| | | | |
|---|---|---|---|
| 6,144,764 | A * | 11/2000 | Yamakawa et al. .......... 382/187 |
| 6,281,931 | B1 * | 8/2001 | Tsao et al. .................. 348/247 |
| 6,578,017 | B1 * | 6/2003 | Ebersole et al. ................ 706/3 |
| 6,581,049 | B1 | 6/2003 | Aparicio, IV et al. |
| 6,760,331 | B1 * | 7/2004 | Moussavi et al. .......... 370/390 |
| 6,876,765 | B2 * | 4/2005 | Suzuki ....................... 382/195 |
| 6,904,408 | B1 * | 6/2005 | McCarthy et al. .............. 705/2 |
| 2003/0033265 | A1 | 2/2003 | Cabana et al. |
| 2003/0134647 | A1 * | 7/2003 | Santhoff et al. ............. 455/456 |
| 2003/0164796 | A1 * | 9/2003 | Needham ............... 342/357.13 |
| 2003/0168513 | A1 * | 9/2003 | Fitzgibbons et al. ... 235/462.01 |
| 2004/0119848 | A1 * | 6/2004 | Buehler ...................... 348/239 |
| 2005/0085240 | A1 * | 4/2005 | Fitzgerald ................ 455/456.1 |

OTHER PUBLICATIONS

Collins,R.T. et al. "Algorithms for Cooperative Multisensor Surveillance" IEEE 2001.*

Collins,R.T. et al. ("A System for Video Surveillance and Monitoring" CMU-RI-TR-00-12, Carnegie Mellon University. 2000.*

Larson,R.C. et al. "Evaluating a Police Implemented AVM System: The St. Louis Experience (Phase I)" IEEE. Feb. 1977.*

Riter,S. et al. "Automatic Vehicle Location—An Overview" IEEE. Feb. 1977.*

Scorer,T. "An Overview of AVL Technologies and Application" Securicor Datatrak 920602.ts. 1993.*

Carter,D.A. "Automatic Vehicle Monitoring: A Life Saver" IEEE. 1980.*

Isla,D.A. et al. "Object Persistence for Synthetic Creatures" ACM. Jul. 2002.*

Austin,J. et al. "Distributed Associative Memory for use in scene analysis" Yellow Report YCS94, Published by University of York, 1986.*

Austin,J. "ADAM: A Distributed Associative Memory for Scene Analysis" Proc. of First Int'l Conf. on Neural Networks, Ed: Caudhill,M. et al. vol. IV. Jun. 1987.*

* cited by examiner

US 7,574,416 B2

DISTANCE-BASED SPATIAL REPRESENTATION AND PREDICTION SYSTEMS, METHODS AND COMPUTER PROGRAM PRODUCTS FOR ASSOCIATIVE MEMORIES

CROSS-REFERENCE

This application claims the benefit of Provisional Application No. 60/537,460, filed Jan. 16, 2004, entitled Distance-Based Spatial Representation and Prediction Systems, Methods and Computer Program Products for Associative Memories, assigned to the assigned of the present invention, the disclosure of which is hereby incorporated herein by reference in its entirety as if set forth fully herein.

FEDERALLY SPONSORED RESEARCH

This invention was made at least in part with government support under National Geospatial-Intelligence Agency Contract No. RTVGN-02-417. The government may have certain rights to this invention.

FIELD OF THE INVENTION

This invention relates to artificial intelligence systems, methods and computer program products, and more particularly to associative memory systems, methods and computer program products.

BACKGROUND OF THE INVENTION

Associative memories, also referred to as content addressable memories, are widely used in the fields of pattern matching and identification, expert systems and artificial intelligence. A widely used associative memory is the Hopfield artificial neural network. Hopfield artificial neural networks are described, for example, in U.S. Pat. No. 4,660,166 to Hopfield entitled Electronic Network for Collective Decision Based on Large Number of Connections Between Signals.

Unfortunately, there is a fundamental scaling problem that can limit the use of associative memories to solve real-world problems. In particular, associative memories generally provide an $N^2$ or geometric scaling as a function of inputs. This geometric scaling may be unreasonable to support applications at the scale of complexity that warrants such technology.

Associative memories are also described in U.S. Pat. No. 6,581,049 to coinventor Aparicio, IV et al., entitled Artificial Neurons Including Power Series of Weights and Counts That Represent Prior and Next Association, assigned to the assignee of the present application, the disclosure of which is hereby incorporated herein by reference in its entirety as if set forth fully herein. As described in the Abstract of the '049 patent, an artificial neuron includes inputs and dendrites, a respective one of which is associated with a respective one of the inputs. Each dendrite includes a power series of weights, and each weight in a power series includes an associated count for the associated power. The power series of weights preferably is a base-two power series of weights, each weight in the base-two power series including an associated count that represents a bit position. The counts for the associated power preferably are statistical counts. More particularly, the dendrites preferably are sequentially ordered, and the power series of weights preferably includes a pair of first and second power series of weights. Each weight in the first power series includes a first count that is a function of associations of prior dendrites, and each weight of the second power series includes a second count that is a function of associations of next dendrites. More preferably, a first and second power series of weights is provided for each of multiple observation phases. In order to propagate an input signal into the artificial neuron, a trace preferably also is provided that is responsive to an input signal at the associated input. The trace preferably includes a first trace count that is a function of associations of the input signal at prior dendrites, and a second trace count that is a function of associations of the input signal at next dendrites. The first and second power series are responsive to the respective first and second trace counts. The input signal preferably is converted into the first and second trace counts, and a trace wave propagator propagates the respective first and second trace counts into the respective first and second power series of weights.

Published U.S. patent application 2003/0033265 to coinventor Cabana et al. entitled Artificial Neurons Including Weights That Include Maximal Projections, the disclosure of which is hereby incorporated herein by reference in its entirety as if set forth fully herein, can allow lossless compression without requiring geometric scaling. In particular, as noted in the Abstract of this published patent application, an artificial neuron includes inputs and dendrites, a respective one of which is associated with a respective one of the inputs. A respective dendrite includes a respective power series of weights. The weights in a given power of the power series represent a maximal projection. A respective power also may include at least one switch, to identify holes in the projections. By providing maximal projections, linear scaling may be provided for the maximal projections, and quasi-linear scaling may be provided for the artificial neuron, while allowing a lossless compression of the associations. Accordingly, hetero-associative and/or auto-associative recall may be accommodated for large numbers of inputs, without requiring geometric scaling as a function of input.

One conventional use of correlational matrices, which may be similar to associative memories, is in spatial representation and prediction. Spatial representation and prediction can apply to many different fields across many scientific disciplines. As an example in applied engineering, spatial prediction may be used in geostatistics to predict unknown values given a set of known values across some continuous map. As an example in pure science, there is a long history in psychology and neurology about the representation of "cognitive maps", perhaps an associative memory of spatial objects used for foraging and wayfinding. There is also extensive literature on machine-based pattern recognition, often applied to optical character and handwriting recognition.

Spatial prediction in geostatistics may incorporate some measure of spatial dependence. However, the standard variogram and Kriging methods are usually applied to prediction of a single contiguous variable (for example, using SAS and/or other standard statistical packages). Assuming continuity of values, co-variance is a function of distance. Given the data values at several points in a map, such methods predict values for the same variable at other nearby points in the map, using some form of interpolation and/or extrapolation.

In biological systems, neural designs of realistic neural theories are emerging, such as William Calvin's Cerebral Code. Calvin's analysis of neural recruitment forms triangular structures of fixed distances within pre-wired grid spaces.

Machine-based pattern recognition may address image patterns (bit patterns) per se. Given patterns of bits, such methods may work to classify a pattern as a known type (such as a particular letter) and/or to complete the pattern within a well-structured grid (such as occluded bits of a letter grid).

SUMMARY OF THE INVENTION

Some embodiments of the present invention provide systems, methods and/or computer program products for predicting a location of a missing object based on a plurality of past sightings of a plurality of objects including the missing object, and a new sighting of the plurality of objects except for the missing object. According to these embodiments, for a respective given object in the plurality of objects, the plurality of past sightings are memorized based on respective distances of respective remaining objects from the respective given object. Distance-based memorization may take place using an agent or associative memory for a respective given object.

Then, for a respective given object in the plurality of objects, except for the missing object, a distance of the missing object from the respective given object is predicted, based on the past sightings that have been memorized and the new sighting, to obtain a plurality of candidate locations for the missing object. The candidate locations are then disambiguated, to predict the location of the missing object.

DETAILED DESCRIPTION

Figure 1:
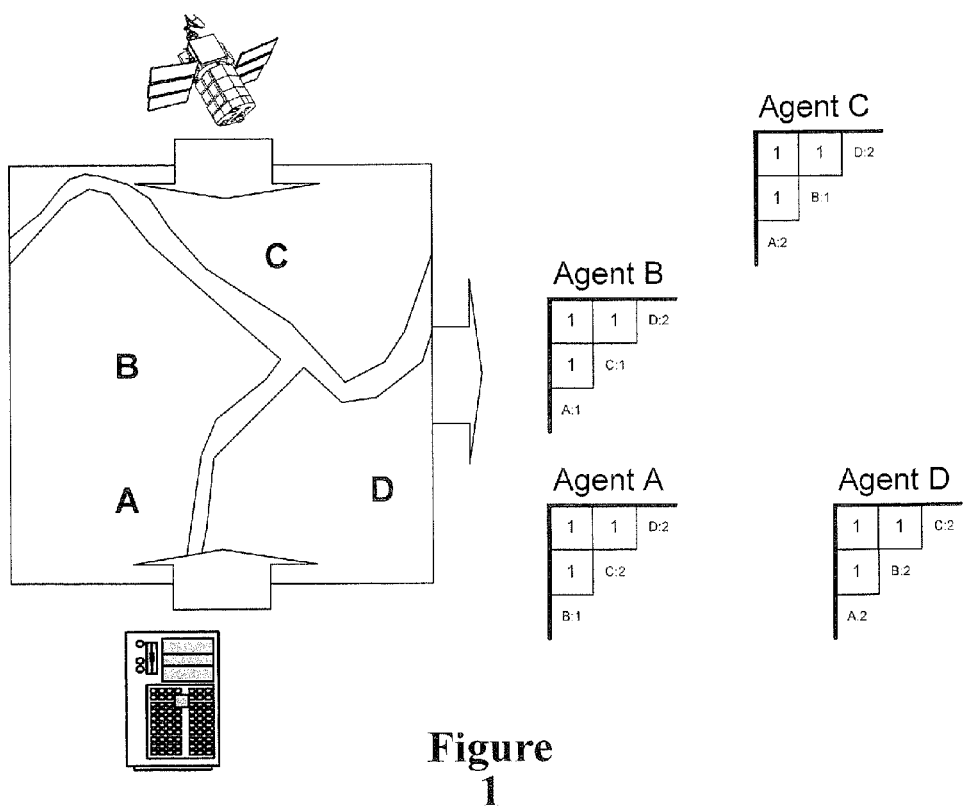
FIG. 1 illustrates distributed representation of multi-agent associative memories according to exemplary embodiments of the invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Some embodiments of the invention can be used for more traditional geostatics and pattern matching. However, some embodiments of the invention can also be used to represent what are often called "labeled locations". Embodiments of the invention can represent and reason about data describing the relative locations of defined objects comprising labels and locations. "Names" may be used interchangeably with "labels".

A name is an identifier, for instance a character string, which can unambiguously identify some object of interest. A location is a point in, for example, a Cartesian plane. Each point is here represented by an ordered pair p=(x, y) of real numbers, but other representations may be used.

According to some embodiments of the present invention, remembering a pattern of labeled locations can involve storage of each name and its point in relationship to all the others. Given a partial, erroneous, or otherwise perturbed (but similar) pattern in the future, associative inference allows the completion and/or correction of the pattern. The description below will focus on completion of partial patterns. Given a set of labeled locations, prediction will suggest any missing but likely relevant names and their likely relative locations.

Spatial prediction, by definition, incorporates spatial dependence. This dependence (the correlational structure between objects names and locations) is captured by an associative memory. In some embodiments, the associative memory may be embodied as was described in U.S. Pat. No. 6,581,049 and/or U.S. Published patent application 2003/0033265. However, in other embodiments, other conventional associative memories may be used. In some embodiments, because each object might be of a different type, each type may be represented by a different associative memory. Beyond single matrix variograms, typical of geostatistics for computing unknown points across a continuous space of a single variable, a respective agent can represent a respective variable among many variables. Each agent contains a matrix of multi-variable inter-distances observed around it.

Such a multi-variable predictive system can utilize the extra computational power of a network of associative memories or agents. Each agent contains one level of the network: a multi-typed associative matrix. The agents together constitute another level of the network: how the agents interact and cohere. Unlike single-matrix single-variable variograms, some embodiments of the invention can represent triples: variograms can store the correlational structure between pairs of points. Thus, an agent can store the correlational structure between pairs of points, given a third point of reference. In other words, each agent can represent the particular perspective of each object type, learning about the correlation structures between other objects around it.

FIG. 1 provides a structural example of such agents and their matrices. Given a set of labeled locations—spatial objects on a map—each object is assigned an agent, which will learn about all observations of other objects from its perspective. Each agent contains an associative matrix to represent the name:distance to name:distance coincidences. The matrices presented in FIG. 1 represent only the single set of observations given by this one pattern; all the co-incidence counts are '1'. However, such matrices may generally store a very large number of other object patterns to represent any number of names:distances (such as A:1 and D:2) and their co-incidence counts. Note that these distances are rounded appropriations for the sake of this illustration.

The computation power in representing triples allows the system to learn about inter-object distances, not just about mere co-existence within a specified continuous neighborhood. According to some embodiments of the present invention, this can lead to a new kind of spatial prediction more representative of complex pattern geometry. The predictions can be invariant (rotational, translational, symmetric, etc) as should be expected of such geometry.

A name-position pair will be referred to herein as a 'sighting', and will be designated symbolically in the form:

⟨name, (x,y)⟩.

A set of sightings may be referred to as a 'pattern'.

A scenario is as follows. A set of objects named $n_1, n_2, \ldots, n_k$ are observed over time. Each observation records the object's name and its position at the time. Thus, a set of patterns is generated:

time 1: $\{⟨n_1,(x_{11},y_{11})⟩,⟨n_2,(x_{21},y_{21})⟩,\ldots,⟨n_k,(x_{k1},y_{k1})⟩\}$ time 2: $\{⟨n_1,(x_{12},y_{12})⟩,⟨n_2,(x_{22},y_{22})⟩,\ldots,⟨n_k,(x_{k2},y_{k2})⟩\}$ time m: $\{⟨n_1,(x_{1m},y_{1m})⟩,⟨n_2,(x_{2m},y_{2m})⟩,\ldots,⟨n_k,(x_{km},y_{km})⟩\}$.

Associative memories are used to represent spatial information of the type described above. The general approach will be illustrated with a concrete example. Suppose the following pattern is represented:

P={⟨A,(0,0)⟩,⟨B,(0,1)⟩,⟨C,(1,2)⟩,⟨D,(2,0)⟩}.

Figure 2:
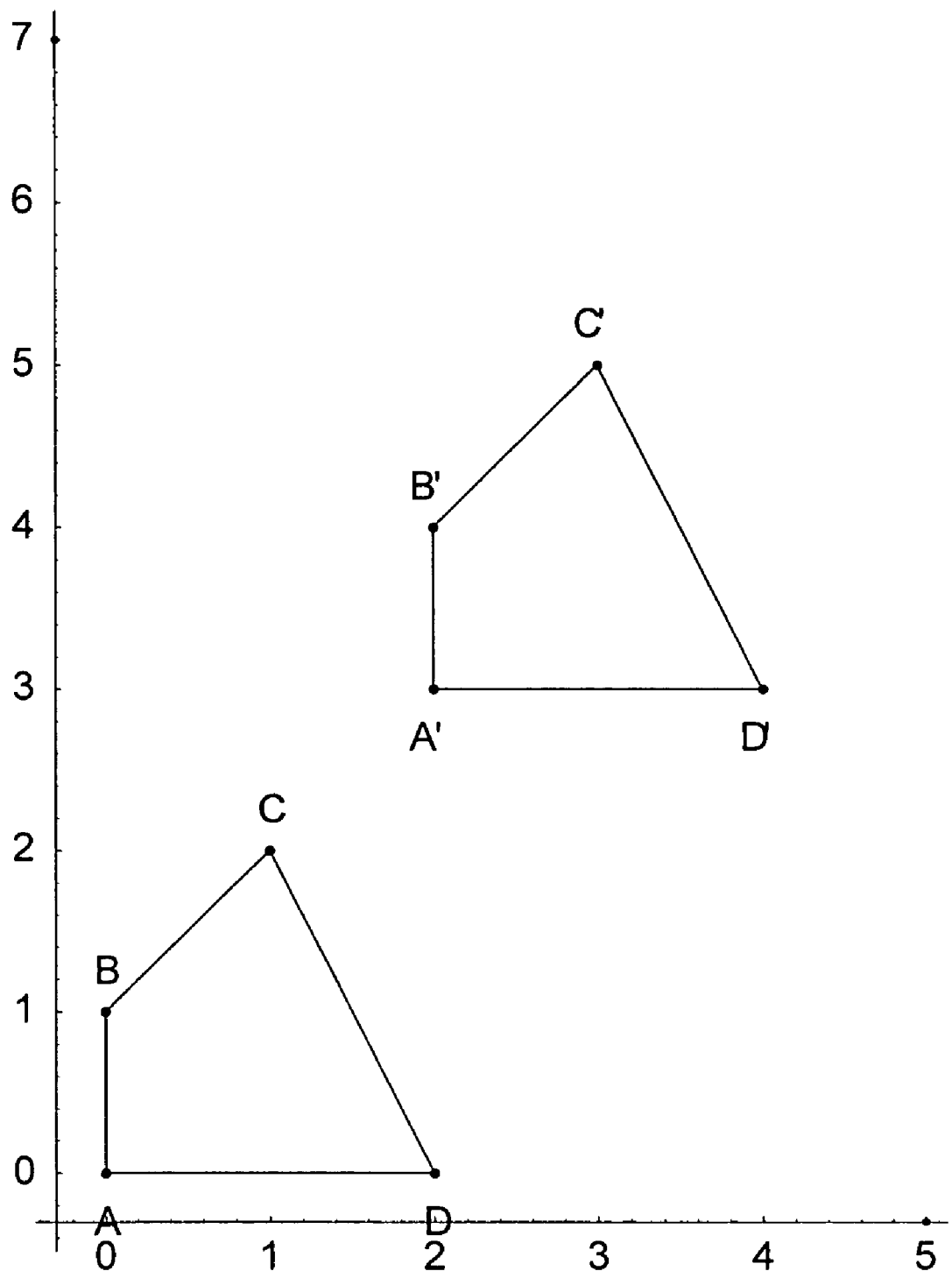
FIG. 2 illustrates a spatial pattern and how it may be defined, according to exemplary embodiments of the invention.
Figure 3:
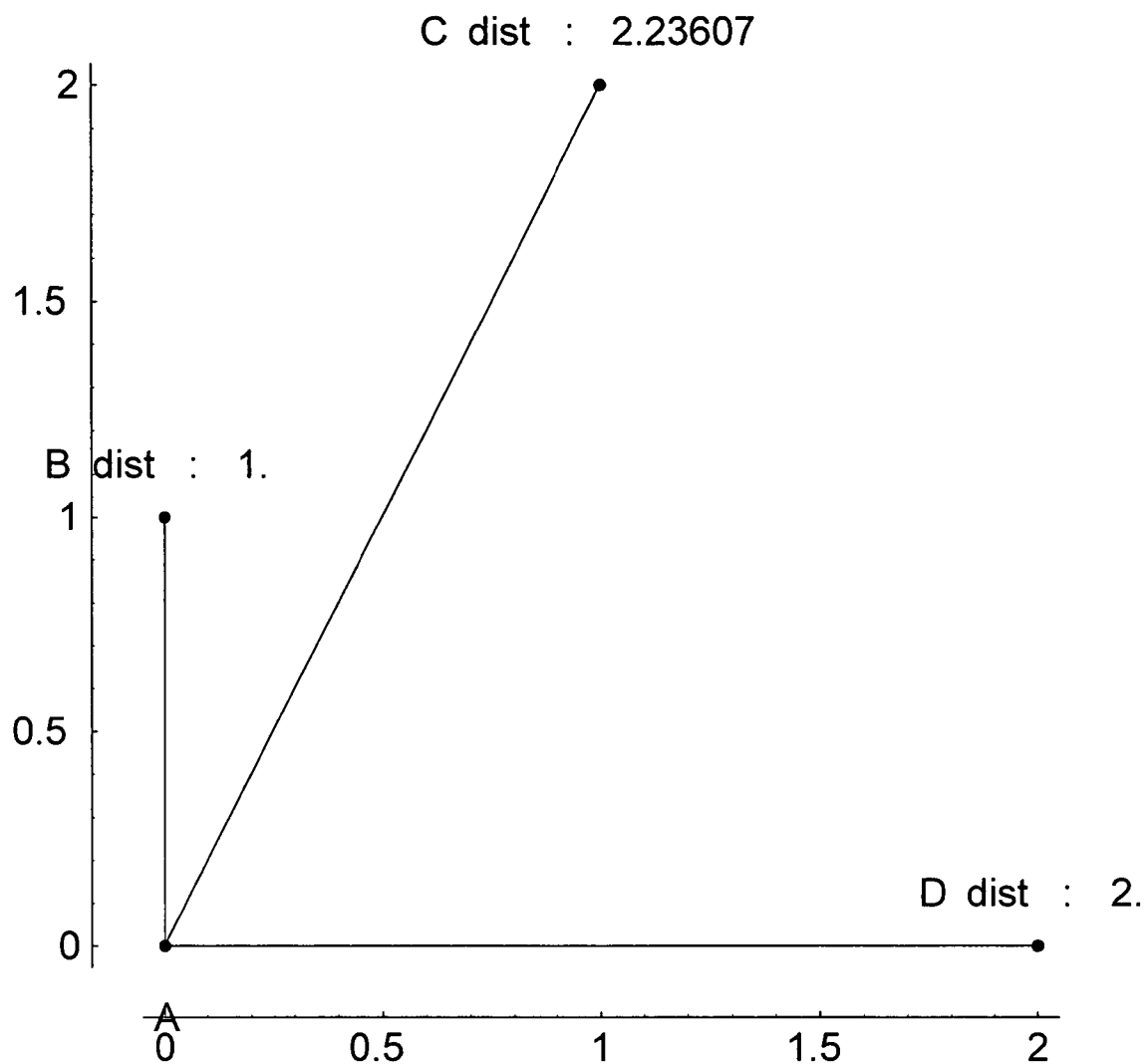
FIG. 3 illustrates observation of objects and distances from perspective of A according to exemplary embodiments of the invention.
Figure 4:
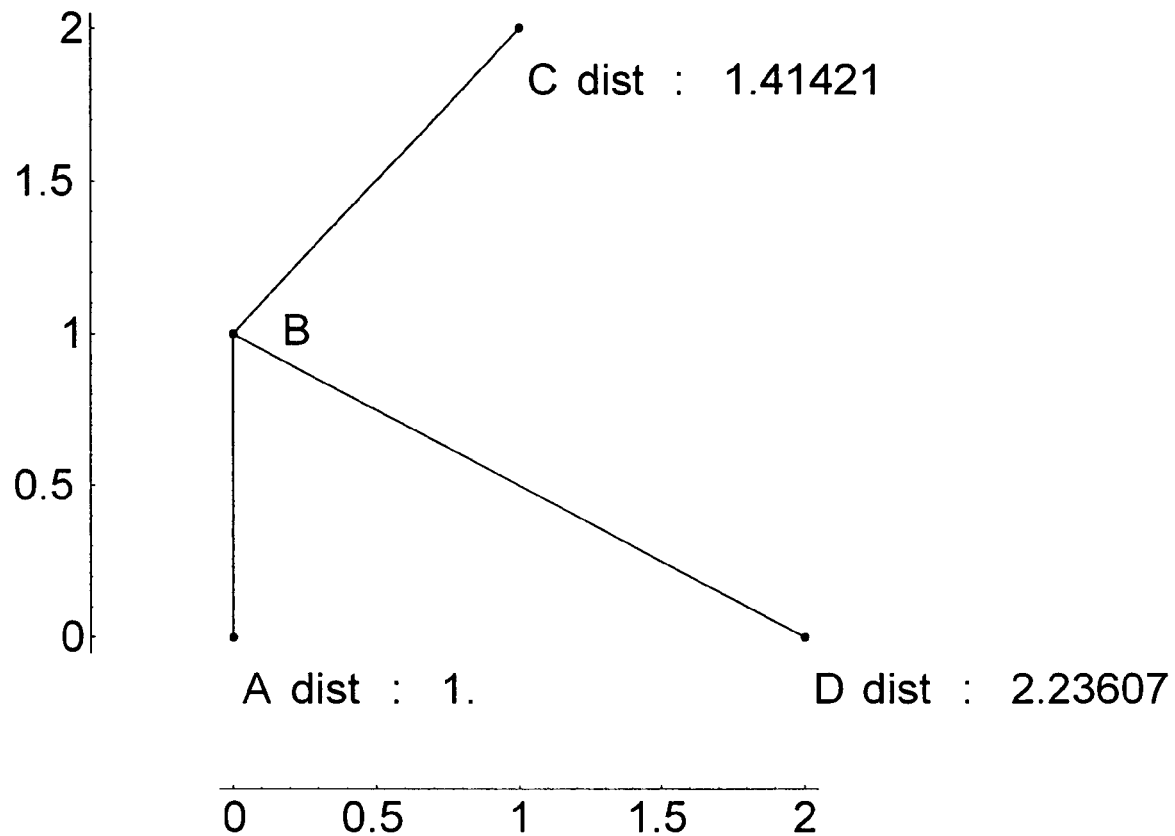
FIG. 4 illustrates observations of objects and distances from perspective of B according to exemplary embodiments of the invention.
Figure 5:
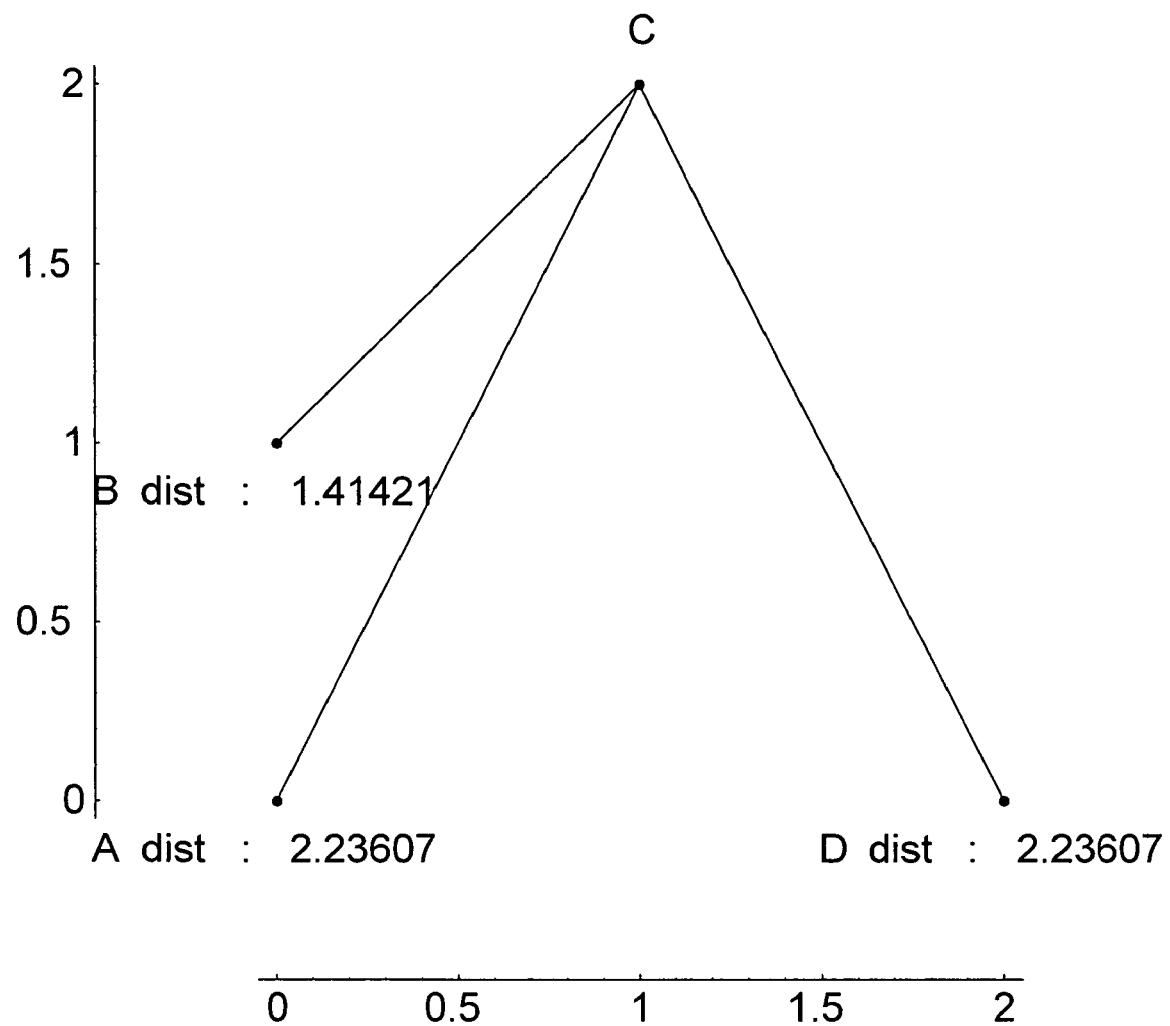
FIG. 5 illustrates observations of objects and distances from perspective of C according to exemplary embodiments of the invention.
Figure 6:
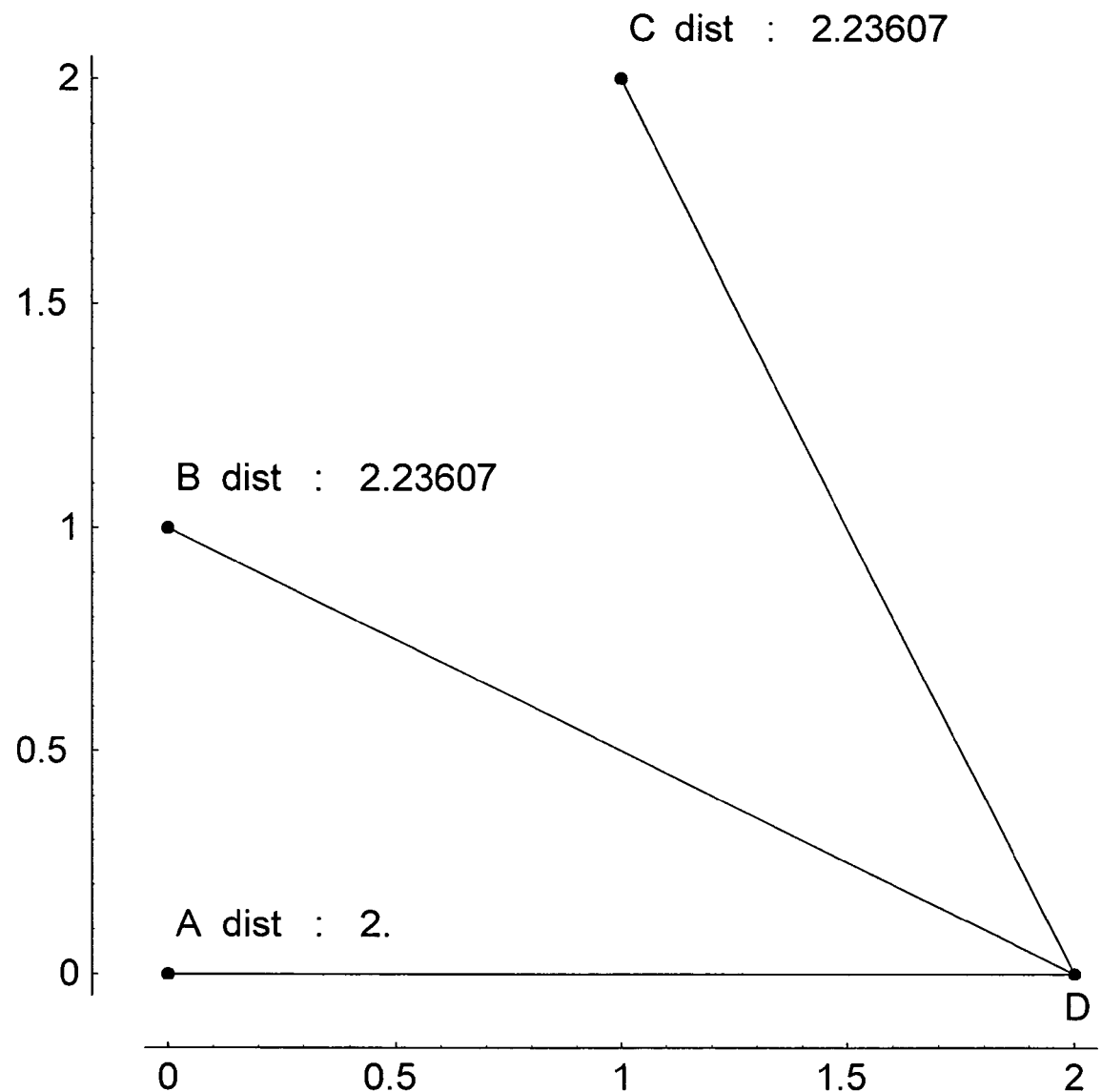
FIG. 6 illustrates observation of objects and distances from perspective of D according to exemplary embodiments of the invention.

FIG. 2 introduces this simple pattern that will be used throughout all the examples. A pattern of 4 objects can be defined by explicit coordinates of the objects as nodes, but the pattern's more general structure is provided by its link distances. The link distances are translationally invariant, defining the two patterns as the same. Such distance representations are rotationally and symmetrically invariant. Scale invariance is also possible through normalization of dimensions. The lower left pattern is used for memorization of P, while a subset of the upper right pattern (D missing) is used for recall.

Each of the named objects (A, B, C, D) is associated with a distinct associative memory. Each object will use the corresponding memory to represent the data from its own point of view.

The A memory represents the data as follows. First it computes the distance from A to each of the other objects in the observation:

distance(A,B)=1 distance(A,C)=$\sqrt{5}$ distance(A,D)=2

The distances may be computed using a standard two-dimensional Euclidean metric. Other metrics could be used with only minor changes. The A memory will use these distances to represent the data.

An associative memory can record the number of times a pair of attributes have been seen to co-occur. In this example we take an attribute to be a name-distance pair. The A memory thus records the following co-occurrences:

B at distance 1 co-occurs with C at distance $\sqrt{5}$.

B at distance 1 co-occurs with D at distance 2.

C at distance $\sqrt{5}$ co-occurs with D at distance 2.

All distances are distances from A's position, given as (0,0) in pattern S.

Notation will now be introduced for describing co-occurrences more succinctly. Thus, "B at distance 1 co-occurs with D at distance 2" will be written as [B:1::D:2].

The A memory's representation of pattern P can be restated as:

[B:1::C:$\sqrt{5}$.],[B:1::D:2], and [C:$\sqrt{5}$::D:2].

Similarly, the B memory representation of P is:

[A:1::C:$\sqrt{2}$],[A:1::D:$\sqrt{5}$], and [C:$\sqrt{2}$::D:$\sqrt{5}$].

The C memory representation of P is:

[A:$\sqrt{5}$::B:$\sqrt{2}$],[A:$\sqrt{5}$::D:$\sqrt{5}$], and [B:$\sqrt{2}$::D:$\sqrt{5}$].

The D memory representation of P is:

[A:2::B:$\sqrt{5}$],[A:2::C:$\sqrt{5}$], and [B:$\sqrt{5}$::C:$\sqrt{5}$].

Notice that any single memory's representation of P generally is insufficient to reconstruct P. The representation of P is distributed across memories. FIG. 3-6 show how each agent's perspective leads to its unique set of distances from it to all the other sightings.

In an associative memory implementation, according to some embodiments of the present invention, this notation may be embodied as a set of Agents, each observing a Context, containing a list of Attributes, each composed of a key and a value. Generally speaking, Attributes can represent Strings, Scalars, and complex types as well. For the representation of spatial patterns, each attribute is a representational encoding of each sighting. In order to include the scalar semantics of distances between sightings, each object name is included as an AttributeKey, with each distance encoded as a Scalar for each key. In other words, the context for each agent is the list of name:distance attributes—from its perspective.

Figure 7:
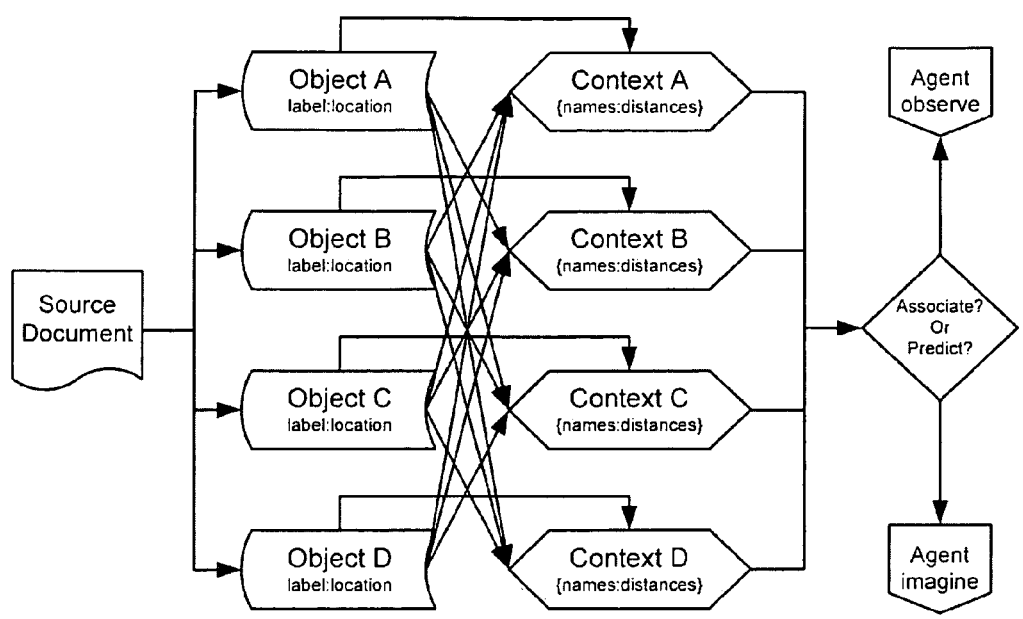
FIG. 7 is a flowchart of operations that may be performed for converting labeled locations to perspective contexts according to exemplary embodiments of the invention.
Figure 8:
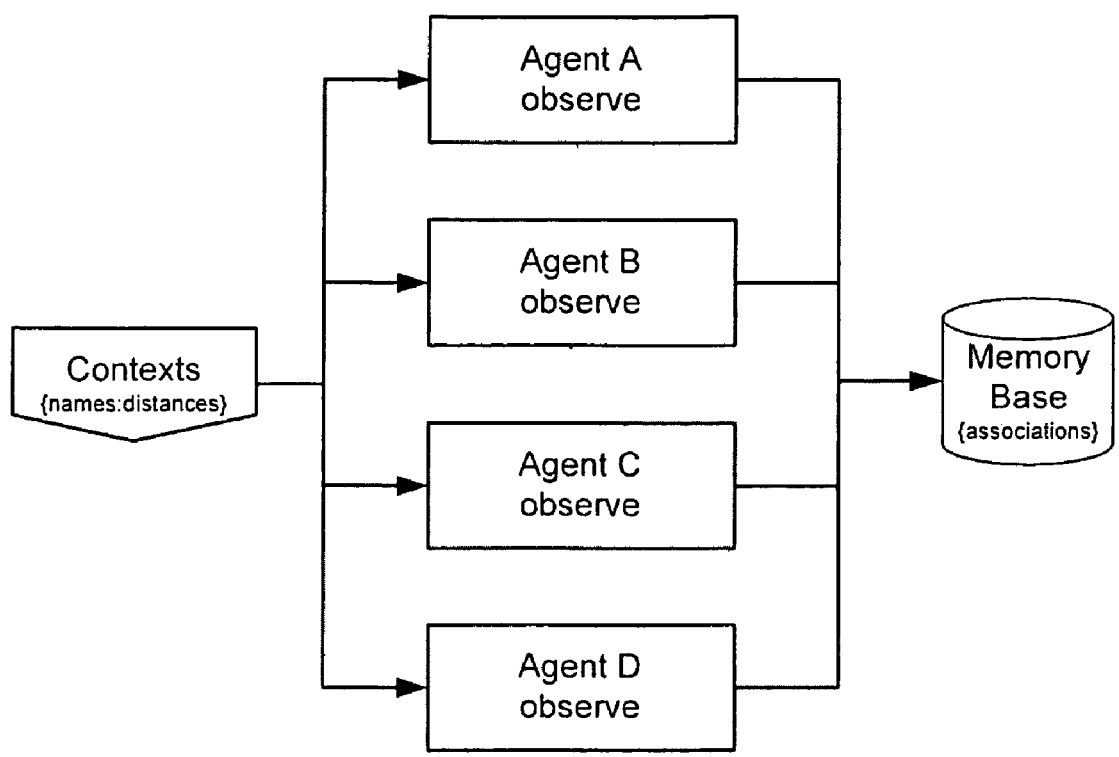
FIG. 8 is a flowchart of operations that may be performed for agents observing their context and storing learned associations according to exemplary embodiments of the invention.

Each agent observes its context, representing its perspective of each pattern, and stores the distance-distance associations in its memory. This is a representation of triples. In anthropomorphic terms, it is as if Agent A remembers that when B is 1 away, then C tends to be 2 away. FIGS. 7-8 diagram the transforming of labeled locations into such associative memories within each agent.

FIG. 7 is a flowchart of operations that may be performed for converting labeled locations to perspective contexts according to exemplary embodiments of the invention. Given each source document map and its labeled-location metadata, the labels are converted into stored object representations, including their locations. For each object, a context is prepared by taking each object's location and computing the distances to the other objects. The context results in a vector set of name:distance attributes for each perspective. Each context is then provided to each respective agent to either observe the given associations or imagine what is possibly missing. "Labels" in the source document are called "names" because they represent the names and namespace of agents.

FIG. 8 is a flowchart of operations that may be performed for agents observing their context and storing learned associations according to exemplary embodiments of the invention. For recording the names and distances that in fact exist in given patterns, each Agent is called with its "observe" method. Each agent forms or updates its associative memory to account for the new co-incidences and persistence its new memory in a file base of database for future updates or predictions.

Figure 9:
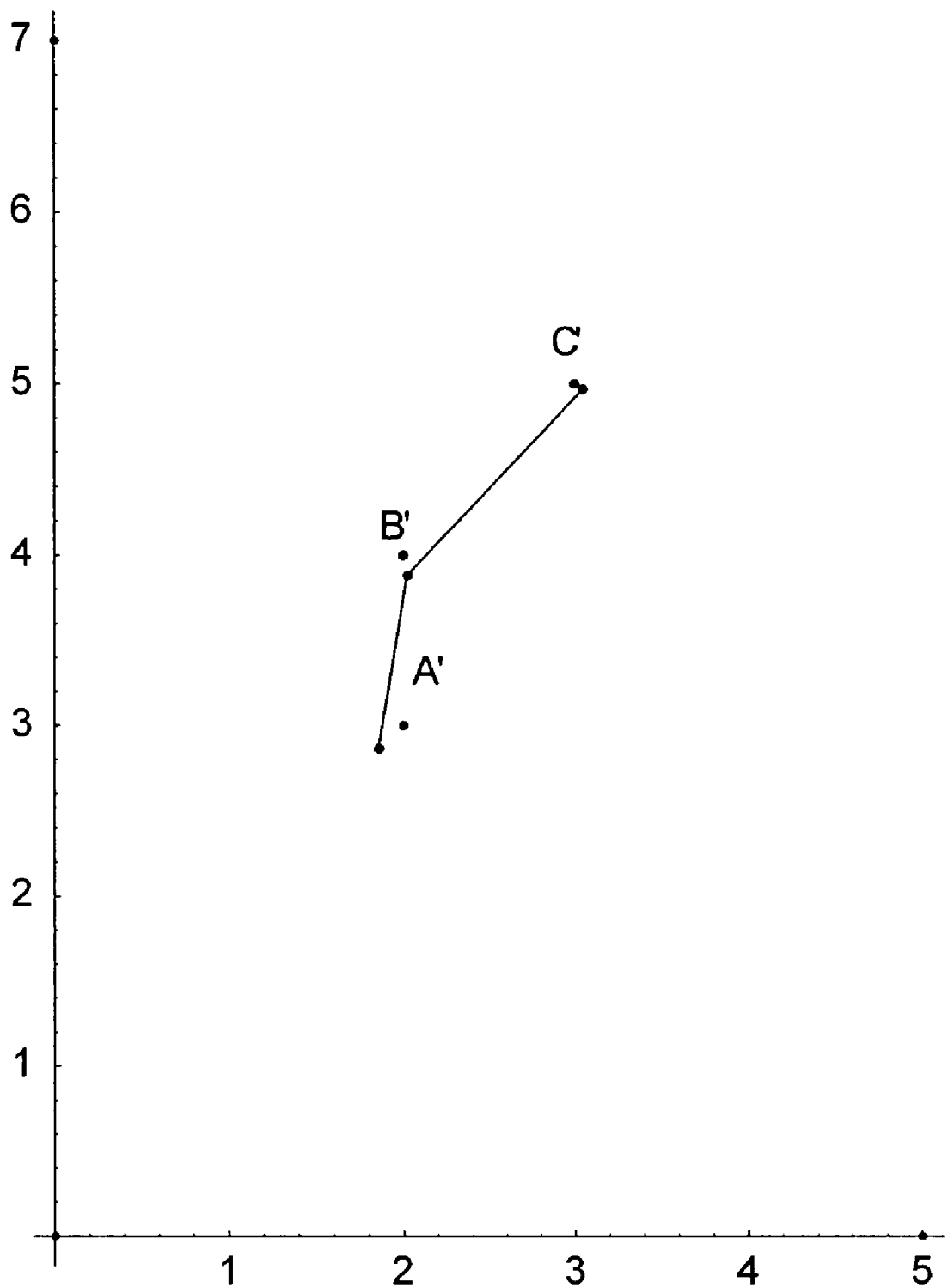
FIG. 9 illustrates test patterns for recall and generalization.

An example will be presented in FIG. 9. Only three of the four original labels are provided. Given the previously memorized pattern, D is apparently missing. The labeled-points indicate what the partial pattern might have looked like in this new position. This pattern is used for recall, changing only the entire position of the pattern. The connected lines show a set of perturbed positions used to test generalization.

In particular, suppose the system which observed P={ ⟨A,(0,0)⟩,⟨B,(0,1)⟩,⟨C,(1,2)⟩,⟨D,(2,0)⟩} is presented with the inferential task of prediction. The system is given T={ ⟨A,(2,3)⟩,⟨B,(2,4)⟩,⟨C,(3,5)⟩} and asked to infer the location of D.

In this example, T was constructed by translating each sighting in P by (2,3) and omitting the sighting with name D. The relative distances of A, B, and C in T are exactly the same as in P. This is intentional, in order to keep this introductory example simple, but this example does illustrate translational invariance; the relative distances, not the absolute positions, are used.

The system is asked to infer the location of D based on the given locations of A, B, and C, and on what it has observed to date, P. The relative positions of A, B, and C in T are consistent with those of A, B, and C in P. The positions of A, B, and C in T are used to compute an inferred position for D by recalling the relative distances to D, conditional on the relative distances between A, B, and C.

Recall that pattern P contained the following information regarding D:
  The A memory saw [B:1::D:2] and [C:$\sqrt{5}$::D:2].
  The B memory saw [A:1::D:$\sqrt{5}$] and [C:$\sqrt{2}$::D:$\sqrt{5}$].
  The C memory saw: [A:$\sqrt{5}$::D:$\sqrt{5}$] and [B:$\sqrt{2}$::D:$\sqrt{5}$]

The pattern T={⟨A,(2,3)⟩,⟨B,(2,4)⟩,⟨C,(3,5)⟩} is decomposed into the co-occurrence of relative distances as below:
  The A memory sees [B:1::C$\sqrt{5}$].
  The B memory sees [A:1::C$\sqrt{2}$].
  The C memory sees: [A:$\sqrt{5}$::B:$\sqrt{2}$].

Previously (that is, in P) when memory A saw B:1, it also saw D:2. Similarly, when A saw C:$\sqrt{5}$, it also saw D:2. Therefore based on P, A imagines that D:2 is the case: that is, that D is at distance 2 from A. A is at (2,3) in T. Thus A imagines D to be somewhere on the circle of radius 2 centered at (2,3).

Similarly, memory B sees A:1 and C:$\sqrt{2}$; both of these lead it to imagine D:$\sqrt{5}$. B imagines that D is on the circle of radius $\sqrt{5}$ centered at B's position in T, (2,4).

Finally, memory C sees A:$\sqrt{5}$ and B:$\sqrt{2}$; both of these lead it to imagine D:$\sqrt{5}$. C imagines that D is on the circle of radius $\sqrt{5}$ centered C's position in T, (3,5).

Figure 10:
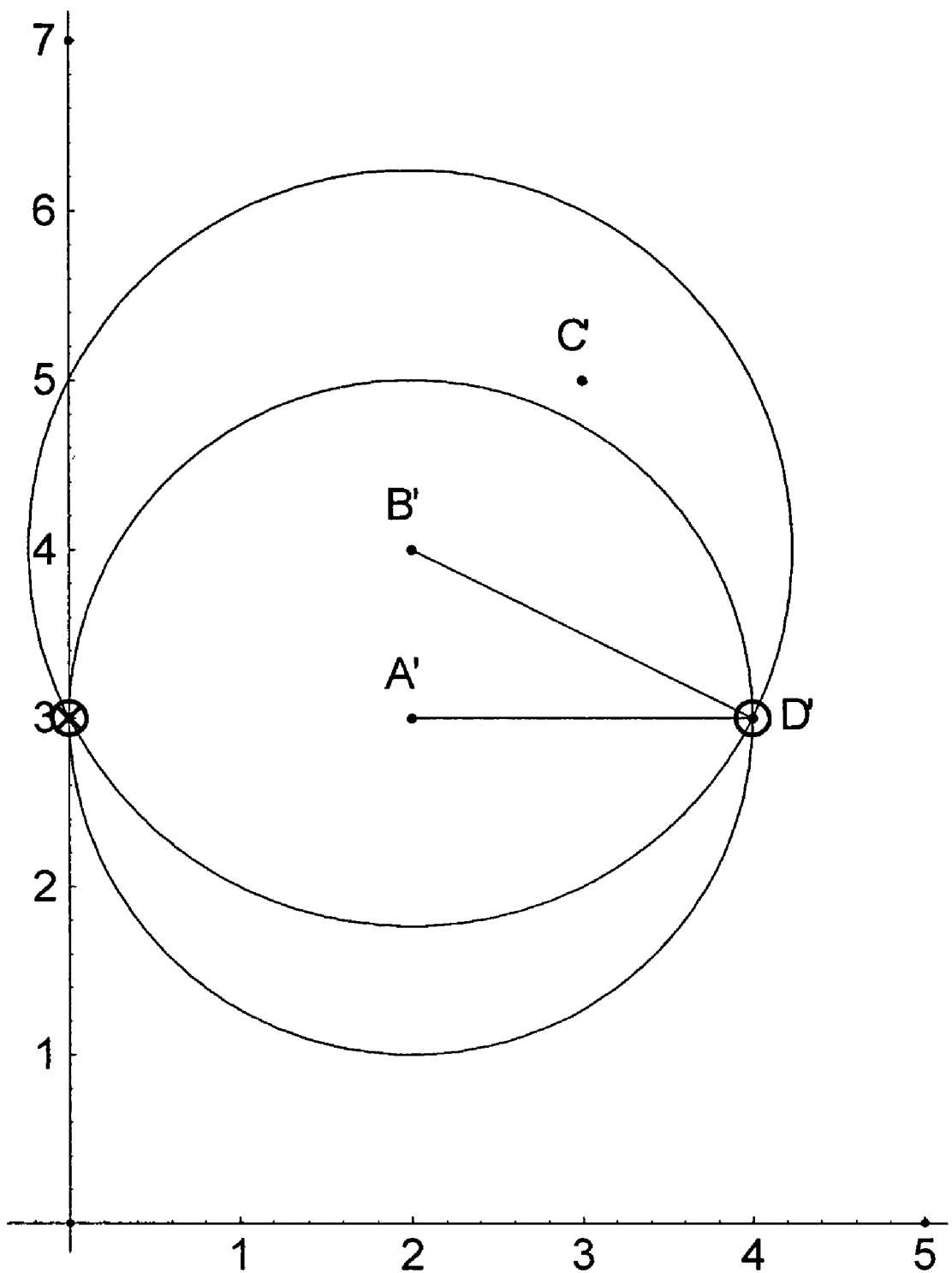
FIG. 10 illustrates predictions and intersections of A and B according to exemplary embodiments of the invention.
Figure 11:
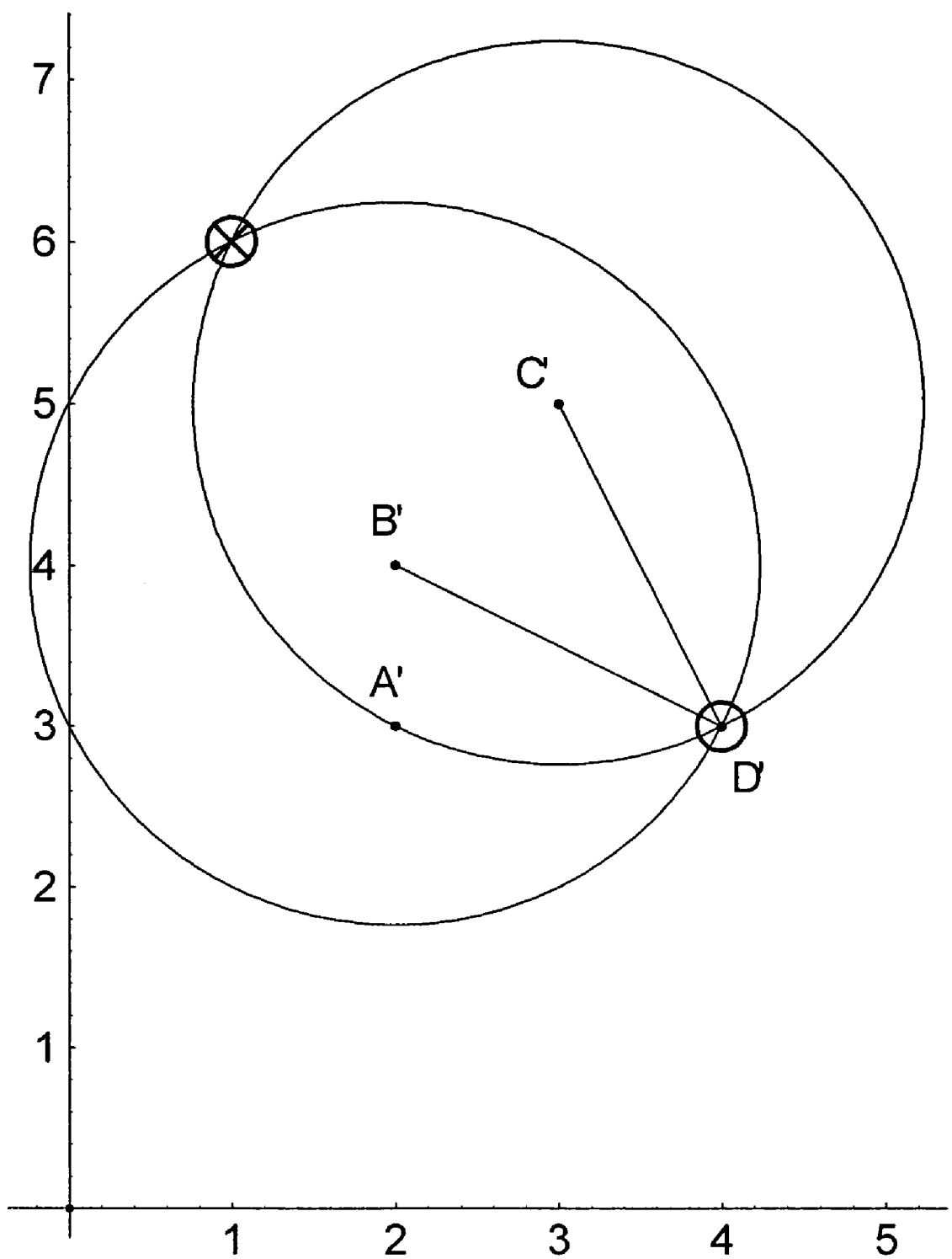
FIG. 11 illustrates predictions and intersections of B and C according to exemplary embodiments of the invention.
Figure 12:
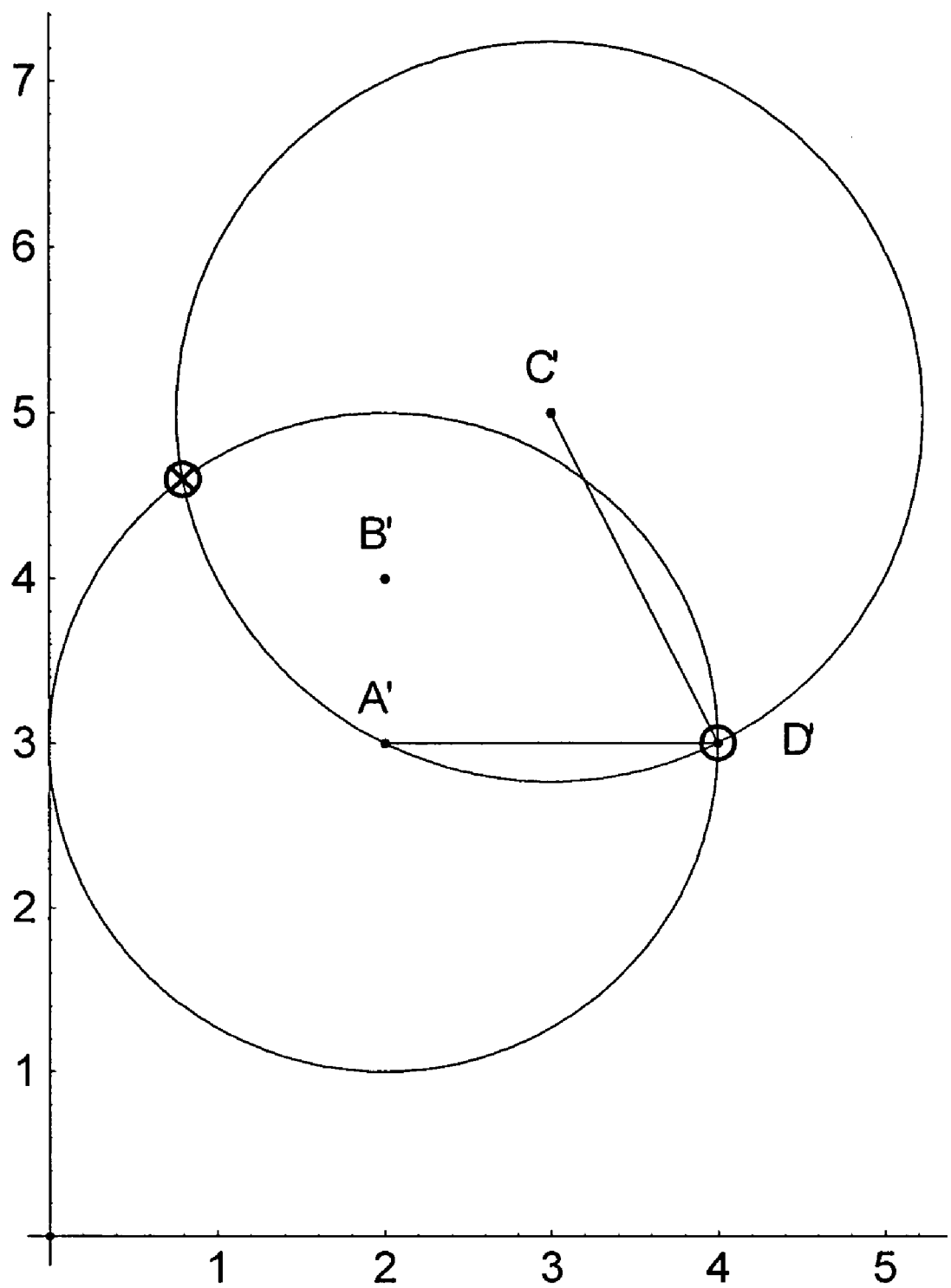
FIG. 12 illustrates predictions and intersections of A and C according to exemplary embodiments of the invention.
Figure 13:
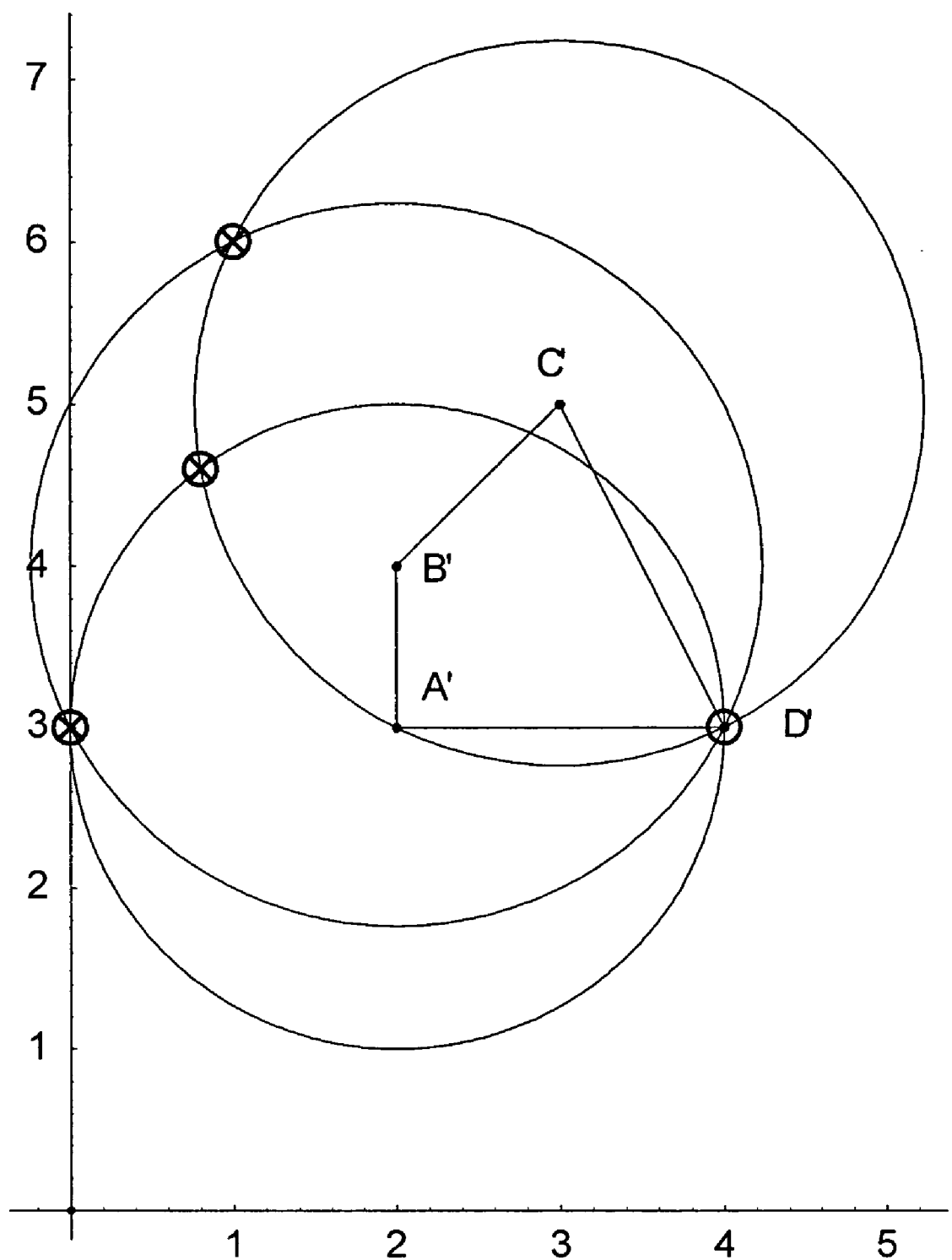
FIG. 13 illustrates coherent recall of D and its location by all perspectives according to exemplary embodiments of the invention.

The situation is illustrated in FIG. 10. Agent A and Agent B both predict D as a missing object. Circle diameters indicate the predicted distances. These circles intersect at 2 points, the possible locations of D from their perspectives. To make a prediction, each agent imagines the missing term and then imagines distance as a circle around its location. FIGS. 10-12 show the intersections for each pair of imagined circles. FIG. 13 shows all the circles and intersections together. All three intersections of likely distances to D result in one coherent point of recall. Other points are also generated by intersecting circles but have been marked by Agent D as spurious. For each pair of point intersections, D is called to imagine itself in these positions and select the most likely of the two.

There are many intersections, but in this simple case of recall, the three circles intersect at a common point, (4,3) which is the expected location of D. D has only been seen at (2,0) in the context of another pattern, but translations, rotations, and flips are irrelevant in seeing the same partial pattern and inferring the likely existence and location of D in the new context.

Figure 14:
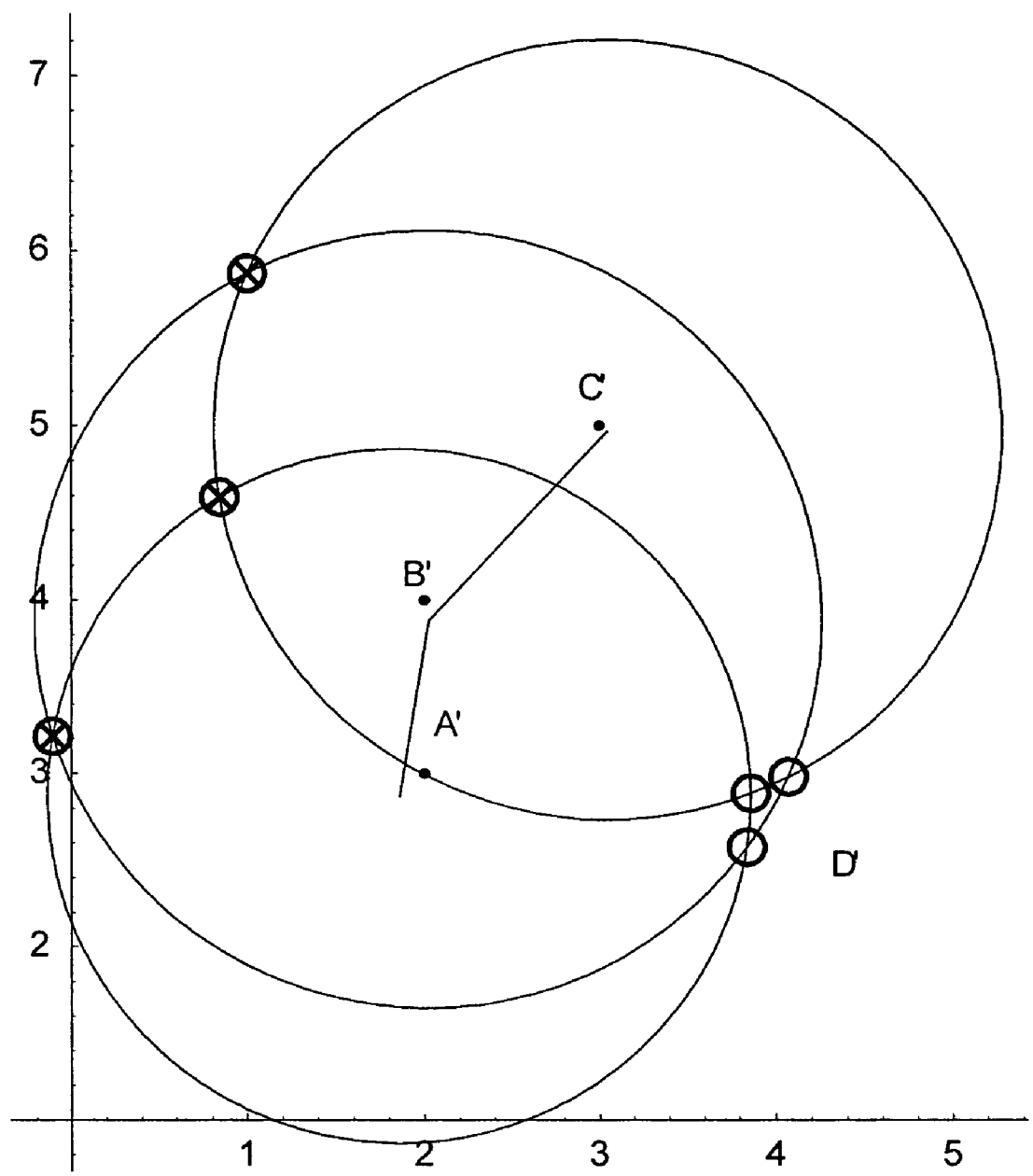
FIG. 14 illustrates generalized recall of D by similarity of distance patterns according to exemplary embodiments of the invention.

The solution may become less clear when the imagined pattern does not exactly match the original distances of a pattern. For example, FIG. 14 illustrates how the intersections disperse to the degree that the given pattern is perturbed. New patterns, even of the same class, are likely to vary from those observed before. As the inter-distances are similar but vary from past memories, the intersection points will also disperse. Geometrically, it appears that the wider angle of the altered pattern (wider than the original pattern) leads to the dispersion of the angle's opposite point. In general, a new pattern might be partially coherent, with many or most of the intersections in cluster, even if some points are outliers. By randomly moving A, B, and C, the intersections no longer have a single common point, but they are still proximal to each other. This demonstrates generalization: when given patterns have never been seen before exactly, the memories will still try to imagine any relevant names and their relative distances. The intersections will be singular and coherent to the degree that the pattern is similar to any past patterns, and will generalize gracefully to the degree it is not.

Such singularity or dispersion can be viewed as a degree of confidence in the prediction. An associative memory can explicitly provide likelihood and confidence metrics. All attributes, such as names:distances, also can provide one of several metrics when imagined. The likelihood of the name and distance are also combined during circle intersections to provide a likelihood of each predicted point. Other metrics such as experience also may be available in order to query the amount of supporting evidence that exists for the inference.

As well, links to the source evidence itself can be stored and recalled within the associative memories. It is interesting to note that the inferences can be developed from multiple sources of original evidence. Because the agents are independent, distributed representations of a pattern and because they make locally-combined intersections with each other, many partial patterns from many sources can combine in the inferences for a new pattern. This is not a simple case-based recall of one or more relevant prior patterns. Prior evidence can also be recalled to support each agent's "perspective" if needed.

Note that many other intersections—aside from the "correct" ones—also exist. In general, the intersection of any two circles can be defined to almost always yield two points. Sometimes, when in perfect agreement, the circles meet in one point. This is conceptually just the perfect convergence of two points, but such perfection may be expected to be extremely rare. Given that embodiments of the invention may be used to generalize to unknown patterns and given some computational imprecision in any case, embodiments of the invention can consider such intersections as generating 2 points.

Figure 15A:
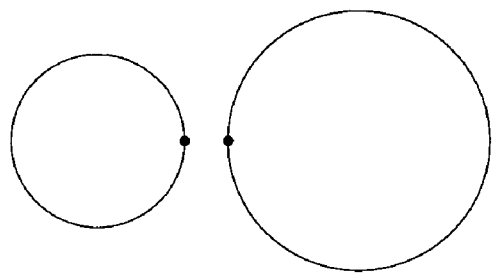
FIGS. 15A-15D illustrate possible intersection points between any two circles according to exemplary embodiments of the invention.
Figure 15B:
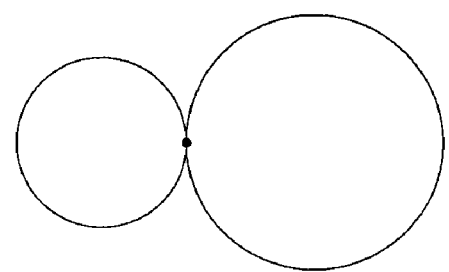
Figure 15C:
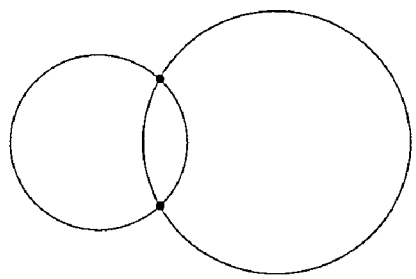
Figure 15D:
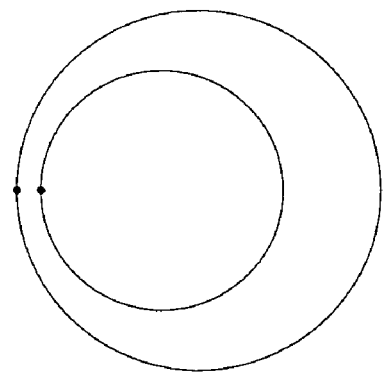

Also consider the case when the circles do not intersect at all. In this case, two points may still be defined, formed by the circles' intersections with the line segment between their centers. FIGS. 15A-15D illustrate these cases and their resulting points. FIG. 15A illustrates closest two points when circles do not overlap. FIG. 15B illustrates circle intersection at one point when circles perfectly touch. FIG. 15C illustrates circle intersections at two points when circles overlap. FIG. 15D illustrates closest two points when one circle is entirely within another. In the very rare case that two circles are perfectly concentric, the intersection is ignored because it provides no additional information. However, the two perfectly concentric circles are potentially predictive when intersecting with other points-circles in the pattern.

This may indicate that something is wrong. Assuming the agents observed one actual location of another object, why should they report back with two? This may be an issue with the super-invariance of using distance, and then trying to reconstruct the point using the intersection of circles. But there is more information available to the network of agents to resolve the problem.

Note the intersection marks on FIGS. 10-14. Each pair of circles produces two points, but they have been marked separately. The open marks are shown for the most likely "true" prediction with crossed marks for the spurious, other point. Based purely on geometry, the intersecting circles produce two points for each pair of distances, but the following additional computations can serve to disambiguate them.

Simply put, disambiguation according to some embodiments of the invention can ask the predicted label (its agent) what it "thinks". If agents A and B both predict D, then agent D can also be invoked, provided with the given pattern and asked to "score" itself at the two imagined positions in order to determine which is most likely correct.

In specific embodiments, whereas, the imagination of names and distances can use an autoassociative query (name: distance attributes), scoring can use a heteroassociative query. This query evaluates the likelihood that all the names and distances in the pattern "belong" to each other. Because the imagined label will have different distances to the other labels (assuming each of its two imagined locations), it evaluates two different patterns and decides to which one it better "belongs", based on its past experience. All the examples show correct marks produced by this technique.

Note that there may be a "critical mass" for the prediction of patterns. A pattern of at least 3 points may be needed. The distance between two points can be memorized, but they do not represent a triple in order to imagine a third object. Even if a third object could be recalled, its disambiguation of intersection points may need at least one other object to better judge which point is correct and which is spurious due to the given pair.

An operational flow according to embodiments of the present invention can reuse much of the representational processes described above. Using Agents, Contexts, and Attributes, the new spatial pattern is converted into agent perspectives. Each context given to each agent represents the names and relative distances of other objects around it. But rather than observe—memorize—the new pattern, prediction can use a "predict" or "imagine" function. Conditional on its perspective context of names and relative distances, each agent is asked to predict or imagine other likely attributes. Each agent provides a list of the most likely other objects and their distances.

Figure 16:
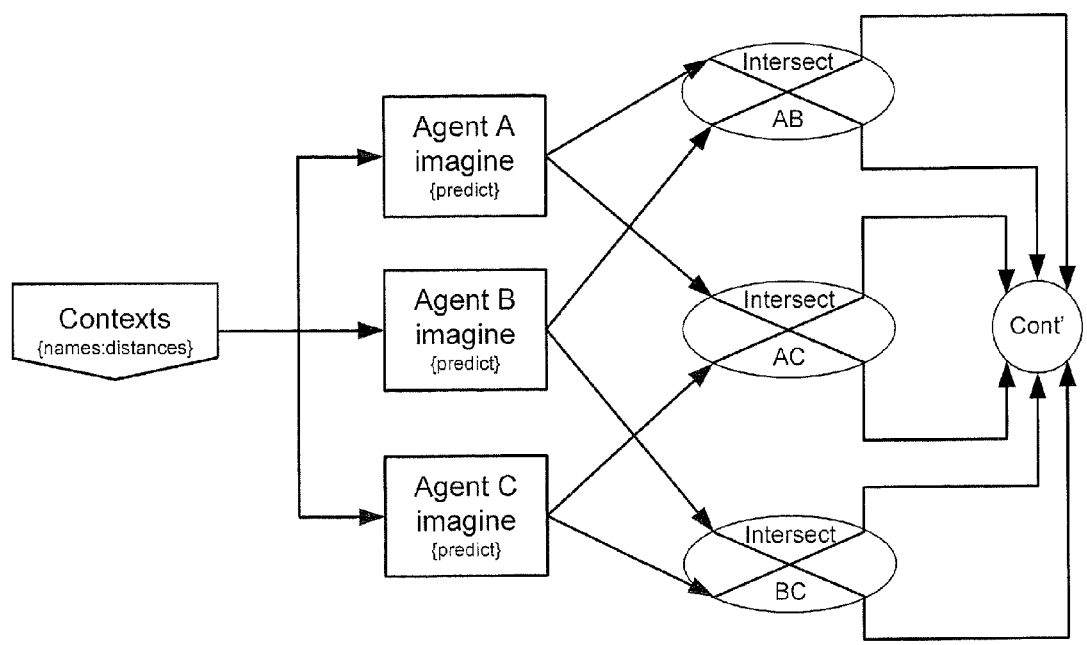
FIG. 16 is a flowchart of operations that may be performed for agents predicting missing objects and likely locations according to exemplary embodiments of the invention.
Figure 17:
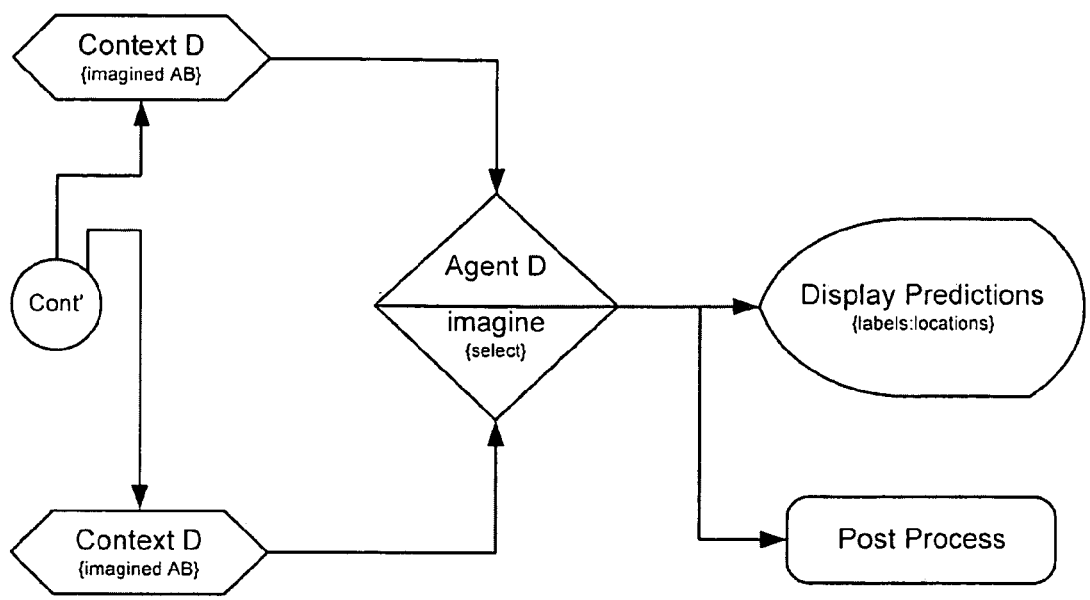
FIG. 17 is a flowchart of operations that may be performed by a missing agent to disambiguate intersection points according to exemplary embodiments of the invention.

Continuing with the operational flow, all these perspectives are then collated into a single answer list. Assuming that some subset of given agents predicts D, all the given object locations and predicted distances are compared pair-wise with each other by intersecting circles. The agent for the predicted missing object is then asked to disambiguate the two intersection points. For example, across all agents predicting D, a set of such points is collated for D and decided by D. Across all the given agents, a set of predicted objects and their locations is collated, decided, and returned for display or further analysis. FIGS. 16-17 provide a diagram of these operations.

FIG. 16 is a flowchart of operations that may be performed for agents predicting missing objects and likely locations according to exemplary embodiments of the invention. Again assuming the preparation of contexts to represent each object-agent perspective, each agent is given its context and called—conditional to the other names and distances—to imagine any likely other objects and their likely relative distances. All the predictions are collated for each missing object (in this case only D) and from the set of given object-agents, the given locations and likely distances define circles. The pair-wise intersections of these circles define a set of predicted locations for the missing object. In the simple case presented here, all three agents predict the occurrence of D at different distances from their positions. These three agent predictions form three circles, which can intersect each other in three ways. Each intersection results in two predicted points.

FIG. 17 is a flowchart of operations that may be performed by a missing agent to disambiguate intersection points according to exemplary embodiments of the invention. In order to disambiguate each pair of points (which intersection is true and which is spurious), the agent of the predicted object is also called to imagine. However, in this case, an imaginary context is prepared, each as if the object were in fact at the predicted location, and the agent is asked to "score" its own likelihood of being at that point. The predicted agent sorts the two scores and selects the one with the greater likelihood. Each such predicted object disambiguates its set of likely locations. To the degree that the newly presented pattern is similar to past learned patterns, these predicted locations will be tightly clustered (subject to the display's presentation scale) and can be directly presented to an end-user for analysis. Alternately, these predicted labeled-locations can be post-processed to further resolve them, decide based on uncertainties, or transform them for any other presentation or analysis.

A distance-based representation according to some embodiments of the present invention can be invariant to rotational, translational, and symmetrical transformations. Scale invariance could also be added by normalization of distances. This is in contrast to the potential cost and/or inflexibility of other "invariant" approaches:

Pre-processing transforms. Many methods will transform the raw feature space into some other invariant representation, such as into the Fourier domain, and then use simple machine learning to remember these orthogonal (linearized) signals. Unfortunately, such methods may require frame and window normalizations of a coordinate grid, and their representations may not be very transparent (such as wavelet coefficients). They may be more appropriate for bit-patterns, not the semantic level of labeled-locations. In contrast, distance-based associative techniques according to some embodiments of the present invention can be more direct and self-explanatory. Furthermore, the distance-associations can include multi-typed objects, including references to source documents for recall of evidence, which other representations may not do.

Massive pre/post variations. A simplistic and/or costly method is often described in which the pattern is explicitly varied during the learning pre-phase or the recall post-phase. For instance, another associative approach called ADAM (A Distributed Associative Memory) describes the "addition of invariance" by generating and training the memory on a vast number of explicit rotational and other variations. In other words, generalization is defined by the scope of variation during the memory's training. Conversely, "mental rotation" is often used during post-training recall in order to find a stored match. Given a prototype example during training, this method tries to rotate the new pattern while checking its match against a library of prototypes. Again, distance-based representation according to some embodiments of the present invention can be faster and more direct, both in learning each single pattern and in associative recall from memory. Also as mentioned above, the predictions can be generated from many sources of evidence, for entirely emergent patterns never seen before.

Graceful generalization can be intrinsic rather than extrinsic according to some embodiments of the present invention. Aside from recognizing the normal variability of patterns (the "springiness" of distance relationships that might be expected from natural objects), such generalization also provides a form of projectional invariance, without the need of mental rotation. Given that many patterns are actually 3 dimensional but viewed or flattened into a 2 dimensional plane from some point above, generalization can also accommodate the stretching of a pattern caused by angular changes in such bird's eye views.

Greater precision and accuracy should also be possible by the inclusion of other spatial data, according to some embodiments of the present invention. For example, while "egocentric" orientation may be a difficult problem, embodiments of the invention could include relative orientations much as was described above with relative distances. Thus, embodiments of the invention also may be suited to correlate any number of dependent/independent variables within one or many memories. Time stamps, predicted times, and even the inclusion of dynamics such as velocities is possible. The inclusion of orientation, however, may be a direct extension of distance which can improve the representation of the "statics". For instance, pair-wise comparisons of relative directions can also result in two intersection points, which the predicted agent can disambiguate. However, the learned associations of distances with directions can provide yet another form of resolution.

Once the predicted labels and locations are produced and somewhat filtered, the resulting set of points for each label may be presented to the user as a "cloud". As briefly mentioned above, each point can also have associated metrics such as a likelihood estimate and/or experience factor. A description of potential displays will now be provided, according to some embodiments of the present invention. On the one hand, the human eyeball may be regarded as an excellent post-processor. By being very transparent with the results and displaying them as a cloud of points, the user can see clusters and coherences (or not) to get the user's own sense of precision and accuracy. On the other hand, presentation of likelihood, experience, and links to evidence for other human factors may be used to provide additional disclosure and interaction with the predictions.

It also will be understood that real data may often result in multiple plausible solutions. This can be handled by returning multiple alternative answers, with scores indicating computed relative strength of the answers. The use of other techniques, such as clustering algorithms, may also help in this regard. While the human eyeball should be able to see the possibility of D in one place (one cluster of points) and D in another place (another cluster of points), additional computation may help quicken the user in such regards. For example, the 3 intersections predicting D in FIG. 13 could be averaged in a number of ways to produce one general location for the user to see. As always, the user should have the ability to specify a limit on the number of returned answers (for example, "Give me the top 5 places where D might be.").

Embodiments of the invention may be scaled in space and/or time. In some embodiments, single memories of over a million attributes, among over a million agents making over a million observations may be provided using only standard desktop computers. Scalar generalization also may be provided according to some embodiments of the present invention, to respect the scalar semantics of numbers in terms of range, resolution, and difference. In other words, a new distance of 7 will recruit memories for distance 8 more than it will for any observation of distance 2.

Unlike geostatistical and statistical methods in general, embodiments of the invention can provide quick, non-parametric, and incremental approaches to machine learning. Beyond single agent learning, embodiments of the invention can also demonstrate the power of distributed learning as a network of networks. Beyond mere correlation, the power of distributed, networked memories can allow for representation of semantic triples, commonly known as semantic graphs. For instance, embodiments of the invention can learn about object co-mentions in transactions and text. Accordingly, embodiments of the invention can be applied to spatial graphs and the inclusion of scalar semantics for co-location in space, not just co-mention in text.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of predicting a location of a missing object based on a plurality of past sightings of a plurality of objects including the missing object and a new sighting of the plurality of objects except for the missing object, comprising:

associating an agent with each respective given object in the plurality of objects, wherein each agent has an associative matrix memory, wherein the agents interact and cohere as a network;

for each respective given object of at least two of the plurality of objects, the respective agent memorizing the plurality of past sightings based on respective distances of respective remaining objects from each respective given object;

for each respective given object of at least two objects of the plurality of objects except for the missing object, predicting a distance of the missing object from the respective given object based on the past sightings that have been memorized and the new sighting, to obtain at least two candidate locations for the missing object, the at least two candidate locations corresponding to the at least two objects of the plurality of objects except for the missing object;

processing the at least two candidate locations corresponding to the at least two of the plurality of objects except for the missing object to predict the location of the missing object, wherein the respective agent associated with the missing object processes the at least two candidate locations to predict the most likely location for its object; and presenting, to a user, at least one of the candidate locations, one of the plurality of past sightings, a new sighting of the plurality of objects, and/or the predicted location of the missing object.

2. The method according to claim 1 wherein memorizing the plurality of past sightings based on respective distances of respective remaining objects from each respective given object comprises memorizing a plurality of pairs of the remaining objects that have co-occurred in the plurality of past sightings from a perspective of each respective given object of at least two of the plurality of objects, and respective distances of the respective plurality of pairs of objects from each respective given object of at least two of the plurality of objects.

3. The method according to claim 2 wherein predicting a distance of the missing object from each respective object of at least two of the plurality of objects based on the past sightings that have been memorized and the new sighting, to obtain a plurality of candidate locations for the missing object comprises predicting a distance of the missing object from each respective object of at least two of the plurality of objects based on the plurality of pairs of the remaining objects that have co-Occurred in the plurality of past sightings from the perspective of each respective object of at least two of the plurality of objects that have been memorized, and the respective distances of the respective plurality of pairs of objects from each respective object of at least two of the plurality of objects that have been memorized 4. The method according to claim. 1 wherein memorizing the plurality of past sightings based on respective distances of respective remaining objects from each respective given object is performed by a plurality of associated memories corresponding to each respective given object of at least two of the plurality of objects.

5. The method according to claim 4 wherein predicting a distance of the missing object from each respective object of at least two of the plurality of objects based on the past sightings that have been memorized and the new sighting also is performed by the plurality of associated memories corresponding to each respective given object of at least two of the plurality of objects.

6. The method according to claim 5 wherein processing the at least two corresponding to the at least two of the plurality of objects except for the missing object comprises:

predicting a location of the missing object by the respective associative memory for the missing object, based on the past sightings that have been memorized by the respective associative memory for the missing object and the new sighting; and comparing the predicted location of the missing object with the at least two candidate locations corresponding to the at least two of the plurality of objects except for the missing object.

7. A computer program product comprising a computer usable storage medium having computer-readable program code embodied in the medium, the computer-readable computer code executing to cause a computer to perform the method of claim 1.

8. A system means for performing the method of claim 1, wherein the system further performs said method.

9. A system of predicting a location of a missing object based on a plurality of past sightings of a plurality of objects including the missing object and a new sighting of the plurality of objects except for the missing object, comprising:

a plurality of associative memories which interact and cohere as a network, each respective one of at least two of the plurality of associative memories is configured to memorize the plurality of past sightings from a perspective of a respective given object of at least two of the plurality of objects, based on respective distances of respective remaining objects from the respective given object, each respective one of the at least two associative memories also being configured to predict a distance of the missing object from the respective given object based on the past sightings that have been memorized and the new sighting, and thereby obtain at least two candidate locations for the missing object, the at least two candidate locations corresponding to at least two associative memories of the plurality of associative memories;

means for processing the at least two candidate locations corresponding to the at least two associative memories to predict the location of the missing object, wherein the respective associative memory associated with the missing object processes the at least two candidate locations to predict the most likely location for its object; and means for presenting, to a user, the predicted location of the missing object.

10. The system according to claim 9 wherein each respective one of at least two of the plurality of associative memories is configured to memorize the plurality of past sightings based on respective distances of respective remaining objects from the respective given object by memorizing a plurality of pairs of the remaining objects that have co-occurred in the plurality of past sightings-from the perspective of the respective given object, and respective distances of the respective plurality of pairs of objects from the respective given object.

11. The system according to claim 10 wherein each respective one of at least two of the plurality of associative memories is configured to predict a distance of the missing object from the respective given object based on the past sightings that have been memorized and the new sighting, by predicting a distance of the missing object from the respective given object based on the plurality of pairs of the remaining objects that have co-occurred in the plurality of past sightings from the perspective of the respective given objects that have been memorized, and the respective distances of the respective plurality of pairs of objects from the respective given objects that have been memorized.

12. The system according to claim 9 wherein the means for processing the at least two candidate locations corresponding to the at least two associative memories to predict the location of the missing object comprises:
   means for controlling the associative memory for the missing object to predict a location of the missing object, based on the past sightings that have been memorized by the associative memory for the missing object and the new sighting; and
   means for comparing the predicted location of the missing object with the at least two candidate locations corresponding to the at least two associative memories.

13. The system according to claim 11 wherein the means for processing the at least two candidate locations corresponding to the at least two associative memories to predict the location of the missing object comprises:
   means for controlling the associative memory for the missing object to predict a location of the missing object, based on the past sightings that have been memorized by the associative memory for the missing object and the new sighting; and
   means for comparing the predicted location of the missing object with the at least two candidate locations corresponding to the at least two associative memories.

14. A computer program product comprising a computer usable storage medium having computer-readable program code embodied in the medium, the computer-readable computer code executing to cause a computer to operate as the system of claim 9.

15. A method of predicting a location of a missing object based on a plurality of past sightings of a plurality of objects including the missing object and a new sighting of the plurality of objects except for the missing object, comprising:
   configuring each respective one of at least two of a plurality of associative memories to memorize the plurality of past sightings from a perspective of each respective object of at least two of the plurality of objects, based on respective distances of respective remaining objects from each respective given object, wherein the plurality of associative memories interact and cohere as a network;
   configuring each respective one of the at least two associative memories to predict a distance of the missing object from each respective given object based on the past sightings that have been memorized and the new sighting, and thereby obtain at least two candidate locations for the missing object, the at least two candidate locations corresponding to the at least two associative memories;
   processing the at least two candidate locations corresponding to the at least two associative memories to predict the location of the missing object, wherein the respective associative memory associated with the missing object processes the at least two candidate locations to predict the most likely location for its object; and
   presenting, to a user, at least one of the candidate locations, one of the plurality of past sightings, the new sighting of the plurality of objects, and/or the predicted location of the missing object.

16. The method according to claim 15 wherein configuring each respective one of at least two of the plurality of associative memories to memorize the plurality of past sightings from a perspective of each respective object of at least two of the plurality of objects, based on respective distances of respective remaining objects from each respective given object comprises configuring each respective one of at least two of the plurality of associative memories to memorize the plurality of past sightings based on respective distances of respective remaining objects from each respective object of at least two of the plurality of objects by memorizing a plurality of pairs of the remaining objects that have co-occurred in the plurality of past sightings from the perspective of each respective object of at least two of the plurality of objects, and respective distances of the respective plurality of pairs of objects from each respective object of at least two of the plurality of objects.

17. The method according to claim 16 wherein configuring each respective one of the at least two associative memories to predict a distance of the missing object from each respective object of at least two of the plurality of objects based on the past sightings that have been memorized and the new sighting, and thereby obtain at least two candidate locations for the missing object, the at least two candidate locations corresponding to the at least two associative memories comprises configuring each respective one of the at least two associative memories to predict a distance of the missing object from each respective object of at least two of the plurality of objects based on the plurality of pairs of the remaining objects that have co-occurred in the plurality of past sightings from the perspective of each respective object of at least two of the plurality of objects that have been memorized, and the respective distances of the respective plurality of pairs of objects from each respective object of at least two of the plurality of objects that have been memorized.

18. The method according to claim 15 wherein processing the at least two candidate locations corresponding to the at least two associative memories to predict the location of the missing object comprises:
   controlling the associative memory for the missing object to predict a location of the missing object, based on the past sightings that have been memorized by the associative memory for the missing object and the new sighting; and
   comparing the predicted location of the missing object with the at least two candidate locations.

19. The method according to claim 17 wherein processing the at least two candidate location corresponding to the at least two associative memories to predict the location of the missing object comprises:
   controlling the associative memory for the missing object to predict a location of the missing object, based on the past sightings that have been memorized by the associative memory for the missing object and the new sighting; and
   comparing the predicted location of the missing object with the at least two candidate locations.

20. A computer program product comprising a computer usable storage medium having computer-readable program code embodied in the medium, the computer-readable computer code executing to cause a computer to perform the method of claim 15.

* * * * *

UNITED STATES PATENT AND TRADEMARK OFFICE
CERTIFICATE OF CORRECTION

PATENT NO. : 7,574,416 B2 Page 1 of 1
APPLICATION NO. : 11/036641
DATED : August 11, 2009
INVENTOR(S) : Aparicio, IV et al.

It is certified that error appears in the above-identified patent and that said Letters Patent is hereby corrected as shown below:

In the Patent
Column 8, Line 2 and 4: Please correct " ⟨A " to read -- <A --

In the Claims
Column 13, Claim 3, Line 59: Please correct "co-Occurred"
to read -- co-occurred --

Column 16, Claim 19, Line 50: Please correct "location" to read -- locations --.

Signed and Sealed this

Sixth Day of October, 2009

David J. Kappos
*Director of the United States Patent and Trademark Office*